United States Patent
Yamada

(10) Patent No.: US 7,271,944 B2
(45) Date of Patent: Sep. 18, 2007

(54) ELECTRO-OPTICAL DEVICE AND ELECTRONIC APPARATUS HAVING THE SAME

(75) Inventor: Katsumi Yamada, Shiojiri (JP)

(73) Assignee: Epson Imaging Devices Corporation, Nagano (JP)

( * ) Notice: Subject to any disclaimer, the term of this patent is extended or adjusted under 35 U.S.C. 154(b) by 0 days.

(21) Appl. No.: 11/355,955

(22) Filed: Feb. 17, 2006

(65) Prior Publication Data

US 2006/0221428 A1 Oct. 5, 2006

(30) Foreign Application Priority Data

Mar. 29, 2005 (JP) ............................. 2005-094118
Dec. 2, 2005 (JP) ............................. 2005-348803

(51) Int. Cl.
G02F 1/03 (2006.01)
G02F 1/07 (2006.01)

(52) U.S. Cl. ...................... 359/245; 349/59; 349/58; 349/74; 359/25

(58) Field of Classification Search ................ 359/245; 349/59

See application file for complete search history.

(56) References Cited

U.S. PATENT DOCUMENTS 6,741,301 B2 * 5/2004 Tsuji ........................... 349/58
7,119,858 B2 * 10/2006 Kim et al. .................... 349/59
2003/0173897 A1 * 9/2003 Iwase et al. ................. 313/512

FOREIGN PATENT DOCUMENTS

| JP | A 2003-207801 | 7/2003 |
| JP | A 2004-078047 | 3/2004 |
| JP | A 2004-087409 | 3/2004 |
| JP | 2005049522 A * | 2/2005 |
| JP | A 2005-077809 | 3/2005 |

* cited by examiner

Primary Examiner—Michael P. Roberts
(74) Attorney, Agent, or Firm—Oliff & Berridge, PLC

(57) ABSTRACT

An electro-optical device includes: a first optical panel having a pair of substrates with an electro-optical material interposed therebetween; a second optical panel that has a pair of substrates with an electro-optical material interposed therebetween, is disposed so as to overlap the first optical panel in plan view, and is smaller than the first optical panel in plan view; an illumination unit having a light source from which light is emitted and a light guiding member that is disposed between the first and second optical panels so as to make the light emitted from the light source incident on the first and second optical panels; and an optical absorber provided in a region other than a display area of the second optical panel between the first and second optical panels.

7 Claims, 5 Drawing Sheets

ELECTRO-OPTICAL DEVICE AND ELECTRONIC APPARATUS HAVING THE SAME

BACKGROUND

1. Technical Field

The present invention relates to an electro-optical device used in, for example, a mobile phone. In particular, the invention relates to an electro-optical device having optical panels disposed at top and bottom surfaces thereof and to an electronic apparatus including the electro-optical device.

2. Related Art

In recent years, in an electronic apparatus such as a mobile phone, a portable computer, or a video camera, an electro-optical device such as a liquid crystal display device is widely used as a display unit. An electro-optical device is disclosed in JP-A-2004-87409 and JP-A-2003-207801 in which two liquid crystal devices are disposed in a handheld information terminal, in particular, such as a mobile phone or a PDA (personal digital assistant), such that back sides of the two liquid crystal devices face each other.

In the electro-optical device, a first liquid crystal panel and a second liquid crystal panel are disposed with a predetermined gap interposed therebetween, and a light guiding member and a transflector are provided between the first and second liquid crystal panels in the order beginning from the first liquid crystal panel side. In addition, some of the light components which have been guided through the light guiding member are reflected by the transflector to propagate toward the first liquid crystal panel and the other light components are transmitted through the transflector to propagate toward the second liquid crystal panel. As such, image light is emitted from a display surface side of each of the liquid crystal panels.

However, in the case in which the first and second liquid crystal panels are disposed opposite to each other with the transflector interposed therebetween in the same manner as in the liquid crystal display devices disclosed in JP-A-2004-87409 and JP-A-2003-207801, the liquid crystal display of one of the liquid crystal panels affects the liquid crystal display by shadowing the other liquid crystal panel, which causes the display to be deteriorated. In order to solve the problem, a double-side display apparatus is disclosed in JP-A-2004-78047 in which the second liquid crystal panel is set to a black display mode (LED is in a normally black mode) so as to shield transmissive light from a bottom surface thereof.

Here, in the liquid crystal display devices disclosed in JP-A-2004-87409 and JP-A-2003-207801, only a technique is disclosed in which the light components, which have been guided through the light guiding member, are divided so as to propagate toward each of the panels by using the transflector. Further, the double-side display apparatus disclosed in JP-A-2004-78047 has been proposed only to consistently prevent a region where the second liquid crystal panel is disposed from becoming bright when viewed from the first liquid crystal panel side, by shielding external light incident from the second liquid crystal panel side. Therefore, in the techniques disclosed in JP-A-2004-87409, JP-A-2003-207801, and JP-A-2004-78047, according to circumstances, a problem occurs in that an area of the second liquid crystal panel becomes dark when viewed from the first liquid crystal panel side.

SUMMARY

An advantage of some aspects of the invention is that it provides an electro-optical device which prevents the shadow caused by a second optical panel from being projected onto a first optical panel with a simple configuration, and an electronic apparatus having the electro-optical device.

According to an aspect of the invention, an electro-optical device includes: a first optical panel having a pair of substrates with an electro-optical material interposed therebetween; a second optical panel that has a pair of substrates with an electro-optical material interposed therebetween, is disposed so as to overlap the first optical panel in plan view, and is smaller than the first optical panel in plan view; an illumination unit having a light source from which light is emitted and a light guiding member that is disposed between the first and second optical panels so as to make the light emitted from the light source incident on the first and second optical panels; and an optical absorber provided in a region other than a display area of the second optical panel between the first and second optical panels.

A problem in the related art is that, in the first optical panel, the intensity of light emitted from a region where the second optical panel is not disposed and the intensity of light emitted from a region where the second optical panel is disposed are different from each other. This is because light emitted from the light guiding member toward the region where the second optical panel is not disposed is reflected by, for example, an inner surface of a casing to propagate toward the first optical panel, and as a result, the intensity of the light emitted from the region where the second optical panel is not disposed becomes stronger than the intensity of light emitted from the region where the second optical panel is disposed.

In the above-described construction, first, light emitted from the light source is guided through the light guiding member to propagate toward the first and second optical panels. Here, among the light components having been guided through the light guiding member, some propagate toward the first optical panel and the others propagate toward the second optical panel. At this time, among the other light components propagating toward the second optical panel, light which is emitted from a region other than a display area of the second optical panel, is then reflected by, for example, an inner surface of a casing, and then propagates toward the first optical panel is absorbed by the optical absorber. Accordingly, in an area of the first optical panel when viewed from the first optical panel side, the intensity of light emitted from a region where the second optical panel is not disposed and the intensity of light emitted from a region where the second optical panel is disposed become approximately equal to each other. As a result, since it is possible to reduce non-uniformity of the display brightness seen from the first optical panel side, the shadow caused by the second optical panel is not projected onto the first optical panel.

Further, in the invention, the electro-optical device includes various electro-optical devices, such as an electro-optical device in which electric energy is converted to optical energy, in addition to an electro-optical device having an electro-optical effect in which the refractive index of a material changes due to the electric field so as to change the transmittance of light. Specifically, an electro-optical device which performs a display by using light emitted from an illumination unit includes a liquid crystal display device, which uses liquid crystal as an electro-optical device material, and an electrophoretic display (EPD) device.

In the electro-optical device described above, it is preferable that the optical absorber is provided on a surface of the light guiding member facing the second optical panel.

In the electro-optical device according to the aspect of the invention, since the optical absorber is provided on one surface of the light guiding member facing the second optical panel, it becomes easier to perform a positional adjustment between the optical absorber and the second optical panel when the optical absorber is disposed in a region other than the display area of the second optical panel.

Further, in the electro-optical device described above, it is preferable to further include a light shielding member that is provided on a surface of the light guiding member facing the first optical panel and has an opening portion through which the light emitted from the light guiding member is incident on a display area of the first optical panel.

In the electro-optical device according to the aspect of the invention, since the light shielding member is provided, it is possible to prevent light emitted from the first optical panel from diffusing through the surface of the first optical panel. That is, with the simple construction described above, most of the light components emitted from the light guiding member can be utilized and the non-uniformity of brightness can be prevented from occurring.

Furthermore, in the electro-optical device described above, it is preferable that the optical absorber is a black resin film.

In the electro-optical device according to the aspect of the invention, since the optical absorber is a black resin film, light can be sufficiently absorbed and the entire device can be made thin.

Furthermore, according to another aspect of the invention, an electro-optical device includes: a first optical panel having a pair of substrates with an electro-optical material interposed therebetween; a second optical panel that has a pair of substrates with an electro-optical material interposed therebetween, is disposed so as to overlap the first optical panel in plan view, and is smaller than the first optical panel in plan view; an illumination unit having a light source from which light is emitted and a light guiding member that is disposed between the first and second optical panels so as to make the light emitted from the light source incident on the first and second optical panels; and an optical absorber provided in a region other than a display area of the second optical panel between the first and second optical panels. The optical absorber is formed with an opening portion through which the light emitted from the light guiding member is incident on a display area of the second optical panel, and an edge of the opening portion is located within a light shielding area located in a peripheral portion of the second optical panel.

In the electro-optical device according to the aspect of the invention, the light emitted from the light source of the illumination unit is guided through the light guiding member to propagate the first and second optical panels. Since some of the light components, which propagate toward the second optical panel, emitted from a region other than the effective display area of the second optical panel are blocked by the optical absorber, the visibility of the second optical panel can be improved.

In addition, according to still another aspect of the invention, an electronic apparatus includes the electro-optical device as a display unit.

According to the aspect of the invention, it is possible to provide an electronic apparatus including an electro-optical device in which a high-quality image can be displayed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
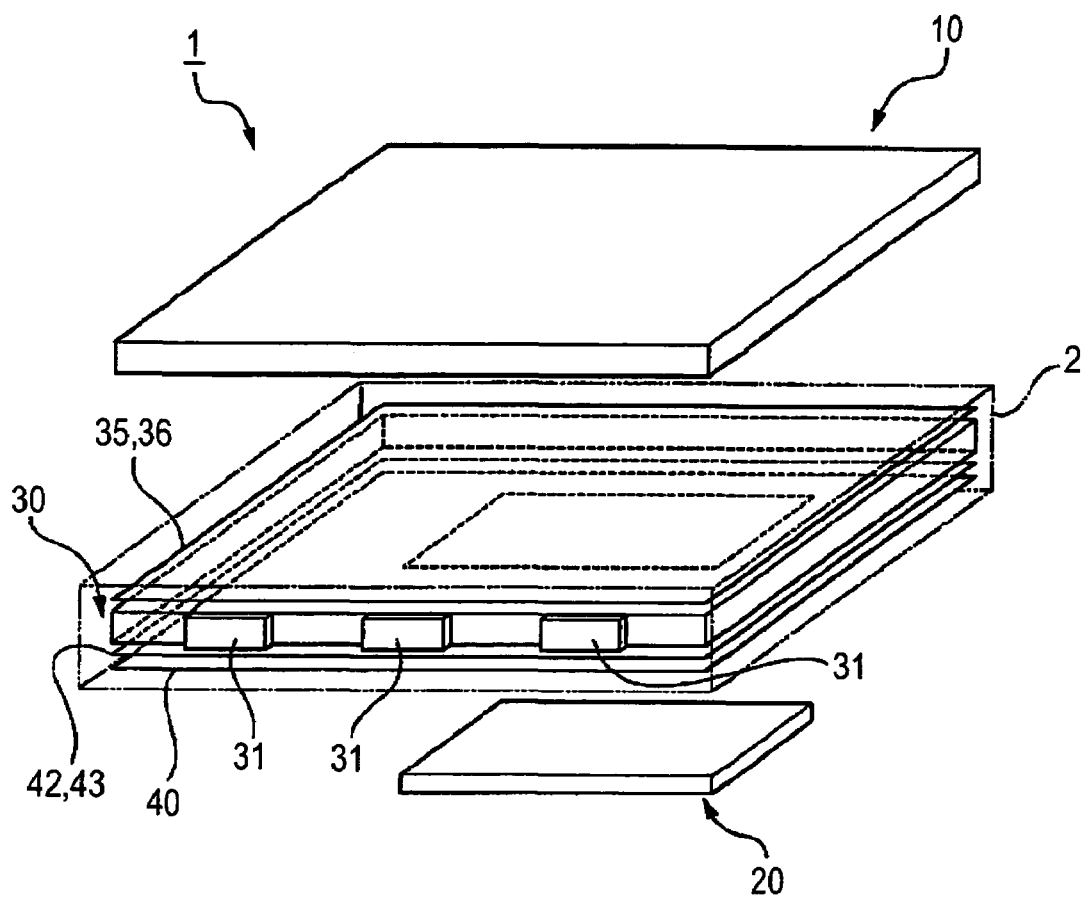
FIG. 1 is an exploded view illustrating an electro-optical device according to a first embodiment of the invention.

Hereinafter, an embodiment of the invention will be described with reference to the accompanying drawings. In addition, the scale of each member is adjusted in order to have a recognizable size in the drawings.

First, a liquid crystal display device, which is an example of an electro-optical device according to an embodiment of the invention, will be described with reference to FIGS. 1 to 5.

Figure 2:
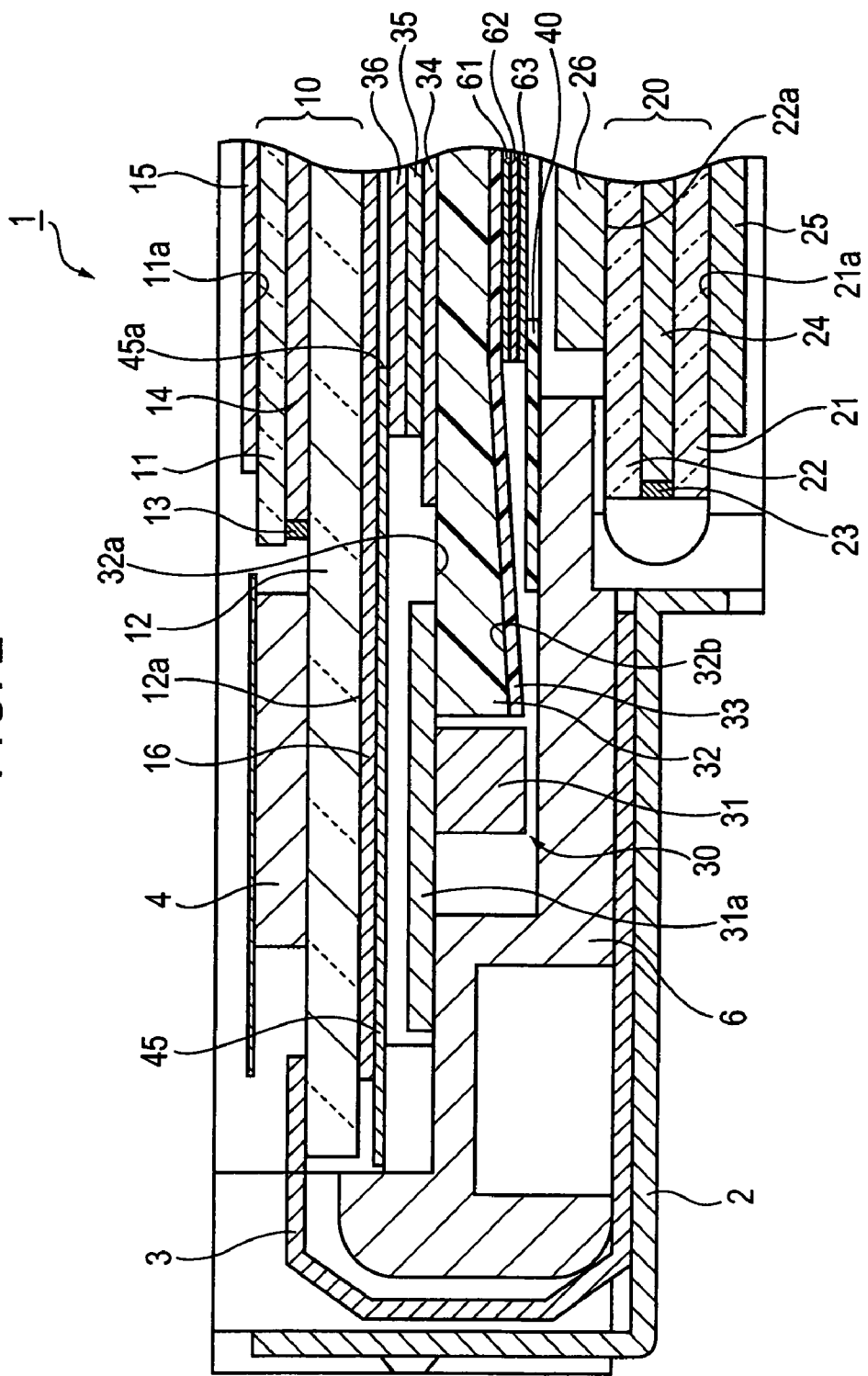
FIG. 2 is a cross-sectional view illustrating main parts of the electro-optical device shown in FIG. 1.

As shown in FIGS. 1 and 2, a liquid crystal display device 1 according to the embodiment of the invention includes a first liquid crystal panel 10 which is disposed within a casing 2 and has a pair of substrates 11 and 12; a second liquid crystal panel 20 which has a pair of substrates 21 and 22, is disposed so as to overlap the first liquid crystal panel 10 in plan view and, and is smaller than the first liquid crystal panel 10 in plan view; an illumination unit 30 used as a backlight for both the first and second liquid crystal panels 10 and 20; and an optical absorber 40 provided between the first and second liquid crystal panels 10 and 20.

As shown in FIG. 2, the first liquid crystal panel 10 includes the pair of substrates 11 and 12 disposed opposite to each other with a cell gap generated by interposing a sealant 13 therebetween, the substrates 11 and 12 having rectangular shapes in plan view; and a liquid crystal layer (electro-optical material) 14 interposed between the substrates 11 and 12. On the substrate 12 side of the first liquid crystal panel 10, the illumination unit 30 is provided. In addition, an emission-side polarizer 15 is provided on an outer surface 11a of the substrate 11 not facing the liquid crystal layer 14, and an incident-side polarizer 16 is provided on an outer surface 12a of the substrate 12 not facing the liquid crystal layer 14. In addition, on the substrate 12, a driver 4 that performs an image display process for the first and second liquid crystal panels 10 and 20 is mounted.

As shown in FIG. 2, in the same manner as in the first liquid crystal panel 10, the second liquid crystal panel 20 includes the pair of substrates 21 and 22 disposed opposite to each other with a cell gap generated by interposing a sealant 23 therebetween, the substrates 21 and 22 having rectangular shapes in plan view; and a liquid crystal layer (electro-optical material) 24 interposed between the substrates 21 and 22. On the substrate 22 side of the second liquid crystal panel 20, the illumination unit 30 is provided. In addition, an emission-side polarizer 25 is provided on an outer surface 21a of the substrate 21 not facing the liquid crystal layer 24, and an incident-side polarizer 26 is provided on an outer surface 22a of the substrate 22 not facing the liquid crystal layer 24.

On a surface of the substrate 21 facing the liquid crystal layer 24, a plurality of scanning lines (not shown) and a plurality of data lines (not shown) are formed in a matrix, and a pixel electrode 42 is provided for each of the regions surrounded by the scanning lines and the data lines. A TFT element 41 is provided at each of the intersections of the scanning lines and the data lines, and the pixel electrode 42 is connected to each of the data lines through the TFT element 41. Accordingly, when a signal is applied to each of the scanning lines and each of the data lines, the TFT element 41 is turned on/off so as to make the signal written onto the pixel electrode 42. On the entire surface formed with the TFT element 41, the pixel electrode 42, and the like, an alignment film 43 having subjected to a rubbing process is formed.

Further, on a lower surface of the substrate 22 facing the liquid crystal layer 24, a peripheral light shielding film 51, a color filter 52, an overcoat layer 53, a common electrode 54, and an alignment film 55 are stacked in this order. The common electrode 54 is a flat film made of a light-transmissive conductive material, such as ITO. The peripheral light shielding film 51 has a rectangular frame shape in plan view, is provided along an inner circumference of the sealant 23, and defines an effective display area A of an image.

Furthermore, the color filter 52 includes light shielding portions 52a, and red, green, blue colored portions 52R, 52G, and 52B. The light shielding portions 52a are formed in a matrix so as to partition the red, green, blue colored portions 52R, 52G, and 52B. In addition, the light shielding portions 52a are made of a black photosensitive resin film, for example.

The substrates 11, 12, 21, and 22 are light-transmissive substrates made of a transparent material, such as glass. In addition, the alignment films 43 and 55 are made of polyimide, for example.

Figure 3:
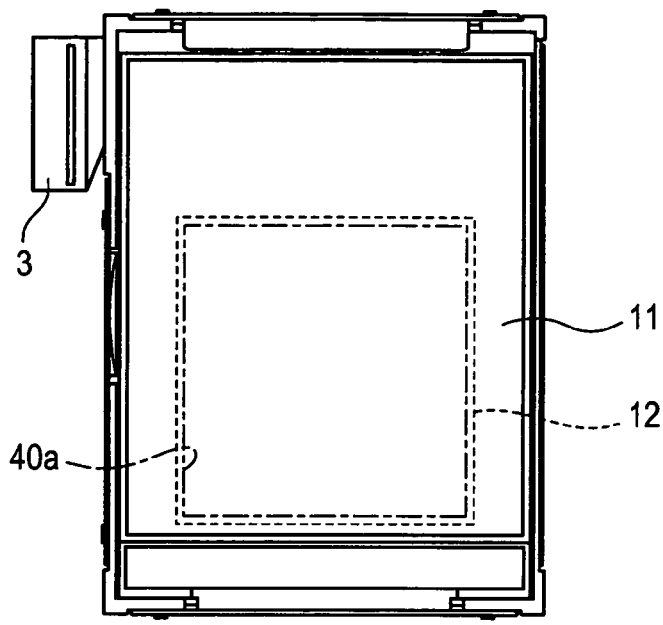
FIG. 3 is a top view illustrating the electro-optical device shown in FIG. 1.
Figure 4:
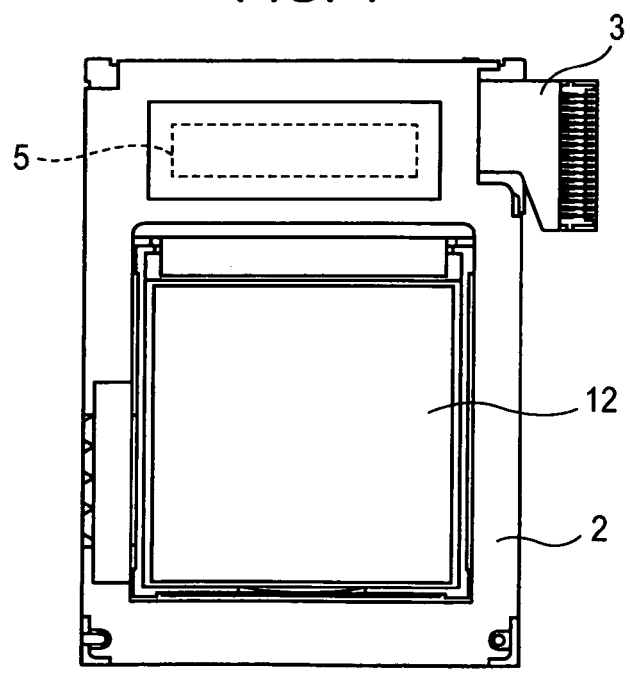
FIG. 4 is a bottom view illustrating the electro-optical device shown in FIG. 1.

Further, as shown in FIGS. 3 and 4, the first and second liquid crystal panels 10 and 20 are provided with an FPC (flexible printed circuit) substrate 3. The FPC substrate 3 is a flexible circuit substrate and is mounted with an electronic component 5, for example.

As shown in FIG. 1, the illumination unit 30 includes a light source 31 which emits light; and a light guiding plate (light guiding member) 32 which is disposed between the first and second liquid crystal panels 10 and 20 and by which light emitted from the light source 31 is incident on each of the first and second liquid crystal panels 10 and 20.

Here, the light source 31 is assumed to be having, for example, an LED (light emitting diode). However, the light source 31 may be having a component other than the LED. For example, the light source 31 may be having an organic electroluminescent element or a semiconductor laser, such as an end-face emitting semiconductor laser or a surface-emitting semiconductor laser. In addition, the light source may be having a cold cathode tube. In addition, the light source 31 is mounted on a substrate 31a, as shown in FIG. 2.

The light guiding plate 32 is a plate made of a light-transmissive material, such as acrylic resin. On one surface 32a of the light guiding plate 32 on which the first liquid crystal panel 10 is disposed, a diffusion sheet 34, a first prism sheet 35, and a second prism sheet 36 are provided in this order.

The diffusion sheet 34 is a plate-shaped sheet member which diffuses light emitted from the light guiding plate 32.

As the diffusion sheet 34, it is possible to use an acrylic sheet on which the diffusing agent is dispersed. By using the diffusion sheet 34, it is possible to make uniform the surface brightness of light emitted from the light guiding plate 32 and to prevent the reflection (non-uniformity of brightness) due to grooves or irregularities of the first prism sheet 35 and the second prism sheet 36.

In addition, in the first and second prism sheets 35 and 36, one surface (facing the first liquid crystal panel 10) of a flat plate made of, for example, a transparent acrylic resin becomes a prism surface, and periodic irregularities (not shown) having a triangular wave shape are formed.

Further, on the other surface 32b of the light guiding plate 32 facing the second liquid crystal panel 20, a transflective sheet 33 is provided. The transflective sheet 33 is having, for example, a transparent resin film, reflects some of the light components, which have been guided through the light guiding plate 32, toward the first liquid crystal panel 10, and transmits the other light components toward the second liquid crystal panel 20.

Figure 5:
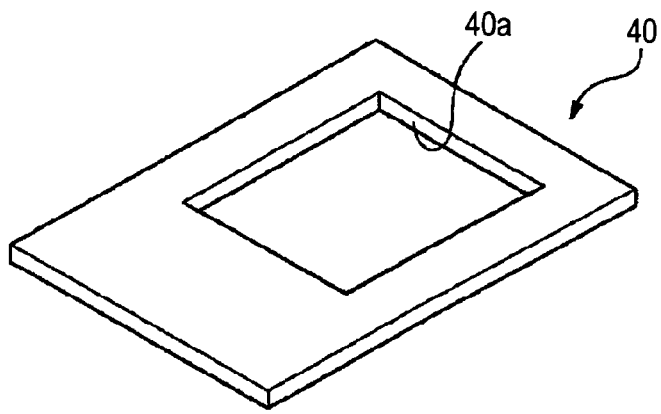
FIG. 5 is a perspective view illustrating an optical absorber of the electro-optical device shown in FIG. 1.

As shown in FIG. 5, the optical absorber 40 is formed with an opening portion 40a having the same size as the second liquid crystal panel 20. In addition, the optical absorber 40 is disposed between the first and second liquid crystal panels 10 and 20, as shown in FIG. 2. Specifically, the optical absorber 40 is provided on the other surface 32b of the light guiding plate 32, and one end portion of the optical absorber 40 is fixed to a frame 6 made of, for example, white resin, the frame 6 being provided to hold the second liquid crystal panel 20. In addition, the optical absorber 40 is provided in a region other than a display area of the second liquid crystal panel 20. That is, the optical absorber 40 is provided such that the opening portion 40a is located in the display area of the second liquid crystal panel 20, as shown in FIG. 3.

Figure 6:
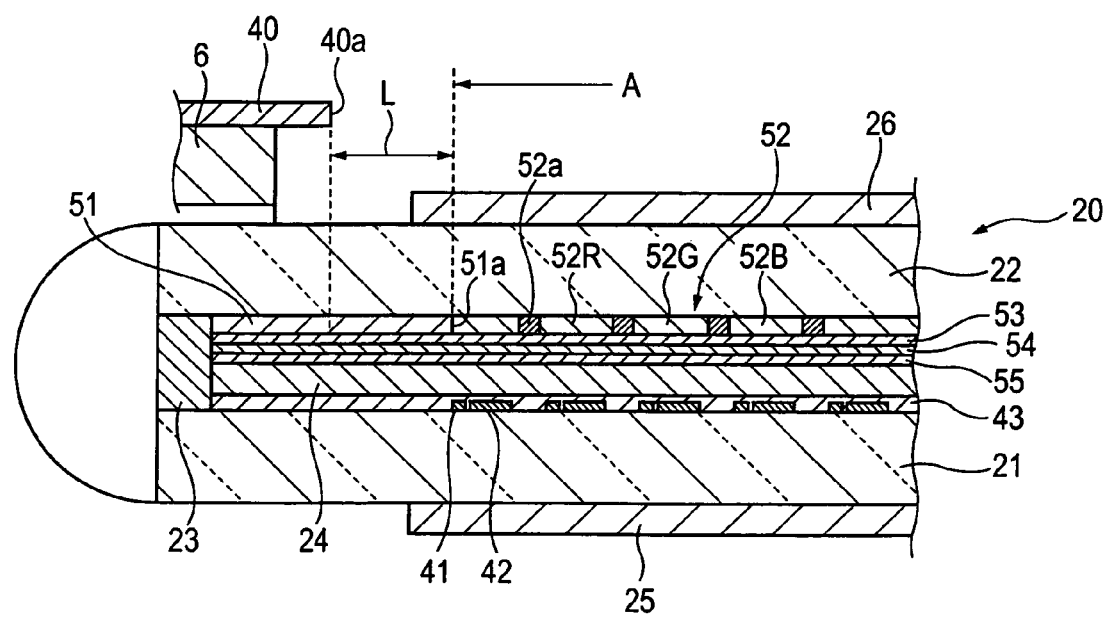
FIG. 6 is an enlarged sectional view illustrating the main parts of the electro-optical device so as to explain the size of the optical absorber of the electro-optical device shown in FIG. 1.

Specifically, the edge of the opening portion 40a of the optical absorber 40 is located within the peripheral light shielding film (light shielding area) 51 located in a peripheral portion of the second liquid crystal panel 20, as shown in FIG. 6. The length L from the edge of the opening portion 40a to an end surface 51a of the peripheral light shielding film 51 facing the color filter 52 should be more than the positional deviation between the second liquid crystal panel 20 and the optical absorber 40 when the liquid crystal display device 1 is fabricated. Thereby, it is possible to prevent the effective display area A from being shielded due to the optical absorber 40. In the present embodiment, the length L is 0.5 mm.

By using the optical absorber 40, it is possible to prevent light which is emitted from the other surface 32b of the light guiding plate 32 and is then emitted from a region other than the effective display area A of the second liquid crystal panel 20. As a result, the visibility of the second liquid crystal panel 20 can be improved.

Further, the optical absorber 40 absorbs light, which is emitted from the other surface 32b of the light guiding plate 32 so as to propagate toward a region other than the display area of the second liquid crystal panel 20, and light which is reflected by an inner surface of the casing 2 or the frame 6 so as to propagate toward the first liquid crystal panel 10 from the second liquid crystal panel 20. That is, in the first liquid crystal panel 10, it is possible to have light, which is emitted from a region where the second liquid crystal panel 20 is disposed, transmitted through the opening portion 40a and to absorb light emitted from a region where the second liquid crystal panel 20 is not disposed.

Furthermore, in the present embodiment, the optical absorber 40 is a resin film made of black polyethyleneterephthalate (PET) material. In addition, even though the polyethyleneterephthalate (PET) has been used as the optical absorber 40, it is possible to use various resin films made of, for example, polyethylenenaphthalate (PEN), triacetylcellulose (TAC), polyarylate, polyimide, polyether, polycarbonate, polysulfone, polyethersulfone, cellophane, polyamide, polyethylene, polypropylene, polyvinylalcohol, without being limited to the polyethyleneterephthalate (PET).

In addition, a diffusion sheet 61, a first prism sheet 62, and a second prism sheet 63, which are the same as the diffusion sheet 34, the first prism sheet 35, and the second prism sheet 36, are provided between the transflective sheet 33 and the optical absorber 40 in the order beginning from the transflective sheet 33 side.

A light shielding member 45 is disposed between the second prism sheet 36 and the incident-side polarizer 16 facing the one surface 32a of the light guiding plate 32 and has an opening portion 45a through which light emitted from the light guiding plate 32 is incident on the first liquid crystal panel 10. The opening portion 45a has a size to cover outer edges and end surfaces of the diffusion sheet 34, the first prism sheet 35, and the second prism sheet 36. Accordingly, it is possible to prevent some of light components emitted from the light guiding plate 32 from being incident on a non-display area located in the peripheral portion of the first liquid crystal panel 10.

Next, an operation of the liquid crystal display device 1 constructed above will be described.

First, the light emitted from the light source 31 is incident on the light guiding plate 32 and is then guided through the inside of the light guiding plate 32. Here, some of the light components guided through the inside of the light guiding plate 32 are reflected toward the first liquid crystal panel 10 due to the transflective sheet 33 provided on the other surface 32b of the light guiding plate 32, the other light components are transmitted toward the second liquid crystal panel 20. At this time, among light components propagating toward the first liquid crystal panel 10, some of the light components emitted from a region other than the display area of the second liquid crystal panel 20 and some of the light components which are reflected by the inner surface of the casing 2 or the frame 6 so as to propagate toward the first liquid crystal panel 10 from the second liquid crystal panel 20 are absorbed by the optical absorber 40. As a result, in an area of the first liquid crystal panel 10 when viewed from the first liquid crystal panel 10 side, the intensity of light emitted from a region where the second liquid crystal panel 20 is not disposed and the intensity of light emitted from a region where the second liquid crystal panel 20 is disposed become approximately equal to each other.

According to the liquid crystal display device 1 of the invention, since the optical absorber 40 is provided, it is possible to reduce non-uniformity of the display brightness seen from the first liquid crystal panel 10 side. As a result, the shadow caused by the second liquid crystal panel 20 is not projected onto the first liquid crystal panel 10.

Electronic Apparatus

Figure 7:
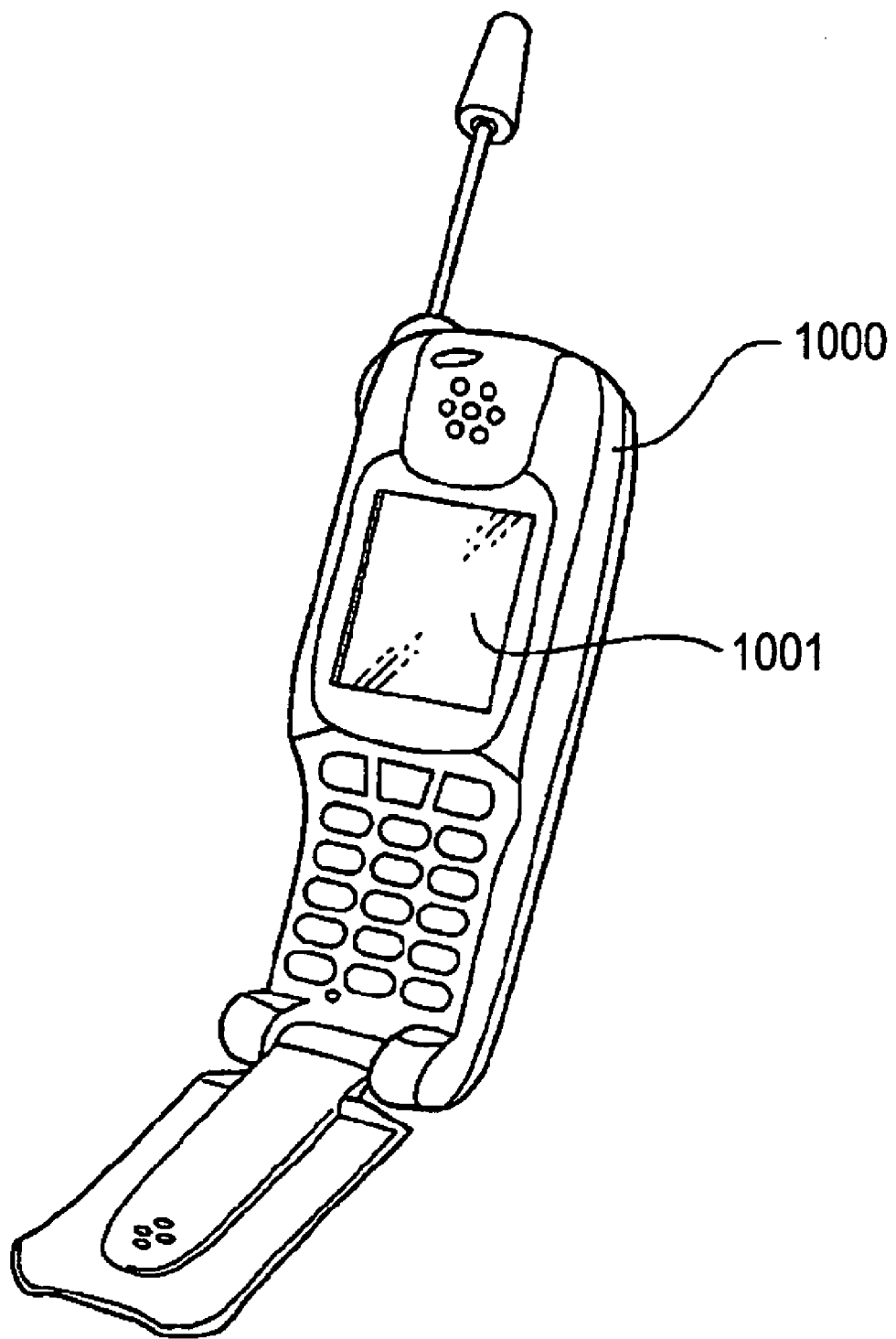
FIG. 7 is a perspective view illustrating an electronic apparatus according to an embodiment of the invention.

Next, an electronic apparatus according to the invention will be described with reference to FIG. 7. FIG. 7 is a perspective view illustrating a mobile phone. In FIG. 7, reference numeral '1000' denotes a mobile phone, and reference numeral '1001' denotes a display unit. The display unit 1001 of the mobile phone 1000 includes a liquid crystal display device, which is an electro-optical device according to the present embodiment. Accordingly, it is possible to provide the mobile phone 1000 which can display a high-quality image and which is slim and light.

The invention is not limited to the mobile phone, but can also be used as image display units of various electronic apparatuses, such as an electronic book, a personal computer, a digital still camera, a liquid crystal television, a viewfinder-type or monitor-direct-view-type video tape recorder, a car navigation device, a pager, an electronic organizer, an electronic calculator, a word processor, a workstation, a video phone, a POS terminal, or a device having a touch panel. In any of the cases described above, it is possible to provide a slim and light electronic apparatus which can display a high-quality image.

Having described the preferred embodiment of the invention with reference to the accompanying drawings, it should be understood that the invention is not limited to the above-described embodiment, but various modifications can be made within the scope without departing from the subject matter or spirit of the invention defined by the appended claims and the entire specification.

For example, as shown in FIG. 2, even though the optical absorber 40 is disposed between the first and second liquid crystal panels 10 and 20 and is also provided to face the other surface 32b of the light guiding plate 32, the optical absorber 40 may be provided to face the one surface 32a of the light guiding plate 32.

The entire disclosure of Japanese Patent Application No. 2005-348803, filed Dec. 12, 2005, is expressly incorporated by reference herein.

What is claimed is:

1. An electro-optical device comprising:
 a first optical panel having a pair of substrates with an electro-optical material interposed therebetween;
 a second optical panel that has a pair of substrates with an electro-optical material interposed therebetween, the second optical panel being disposed so as to overlap the first optical panel in plan view and being smaller than the first optical panel in plan view;
 an illumination unit having a light source from which light is emitted and a light guiding member that is disposed between the first and second optical panels so as to make the light emitted from the light source incident on the first and second optical panels;
 a peripheral light shading film formed in a peripheral portion of the second optical panel and located between the pair of substrates of the second optical panel; and
 an optical absorber provided in a region other than a display area of the second optical panel between the first and second optical panels, the optical absorber being formed with an opening portion, light emitted from the light guiding member being incident on the display area of the second optical panel through the opening portion in the optical absorber, an edge of the opening portion being located at a position that overlaps the peripheral light shielding film of the second optical panel.

2. The electro-optical device according to claim 1, wherein the optical absorber is provided on a surface of the light guiding member facing the second optical panel.

3. The electro-optical device according to claim 1 further comprising:
 a light shielding member that is provided on a surface of the light guiding member facing the first optical panel and has an opening portion through which the light emitted from the light guiding member is incident on a display area of the first optical panel.

4. The electro-optical device according to claim 1, wherein the optical absorber is a black resin film.

5. An electronic apparatus comprising the electro-optical device according to claim 1 as a display unit.

6. The electro-optical device according to claim 1, the opening of the optical absorber being configured in such manner that the optical absorber completely surrounds the display area of the second optical panel.

7. The electro-optical device according to claim 1, the opening having a rectangular shape, and the optical absorber surrounds all four sides of the second optical panel.

* * * * *